(12) United States Patent
Yamagami et al.

(10) Patent No.: US 9,435,078 B2
(45) Date of Patent: Sep. 6, 2016

(54) PAPER RECYCLING DEVICE AND PAPER RECYCLING METHOD

(71) Applicant: SEIKO EPSON CORPORATION, Tokyo (JP)

(72) Inventors: Toshiaki Yamagami, Nagano (JP); Ken Ikuma, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/859,789

(22) Filed: Sep. 21, 2015

(65) Prior Publication Data

US 2016/0010278 A1    Jan. 14, 2016

Related U.S. Application Data

(62) Division of application No. 14/484,385, filed on Sep. 12, 2014, now Pat. No. 9,194,081, which is a division of application No. 13/979,089, filed as application No. PCT/JP2011/007124 on Dec. 20, 2011, now Pat. No. 8,882,965.

(30) Foreign Application Priority Data

Jan. 12, 2011  (JP) .................................. 2011-004113
Jan. 14, 2011  (JP) .................................. 2011-005573
Jan. 14, 2011  (JP) .................................. 2011-005574

(51) Int. Cl.
*D21D 5/24*    (2006.01)
*D21F 7/06*    (2006.01)
(Continued)

(52) U.S. Cl.
CPC . *D21F 7/06* (2013.01); *D21B 1/08* (2013.01); *D21C 5/025* (2013.01); *D21D 5/24* (2013.01); *D21F 9/02* (2013.01); *D21G 9/0027* (2013.01); *Y02W 30/642* (2015.05)

(58) Field of Classification Search
CPC ............. D21D 5/24; D21C 5/00; D21B 1/32
USPC ....................................................... 162/261, 4
See application file for complete search history.

(56) References Cited

U.S. PATENT DOCUMENTS 4,668,339 A    5/1987  Terry
5,564,635 A    10/1996 Terada et al.
(Continued)

FOREIGN PATENT DOCUMENTS

JP    50-069306 A    6/1975
JP    52-144407 A    12/1977
(Continued)

OTHER PUBLICATIONS

Extended European Search Report for the corresponding European patent application No. 11855915.2 dated Jun. 20, 2014.

*Primary Examiner* — Mark Halpern
(74) *Attorney, Agent, or Firm* — Global IP Counselors, LLP

(57) ABSTRACT

A paper recycling device includes a dry type defibrator, a first transport unit, a classifier unit, a second transport unit a paper forming unit and a control unit. The dry type defibrator unit is configured to defibrate first paper into defibrated material. The first transport unit is configured to transport the defibrated material after being defibrated by the dry type defibrator unit. The classifier unit is configured to deink by an air flow classification the defibrated material after being transported by the first transport unit. The second transport unit is configured to transport the defibrated material after being deinked by the classifier unit. The paper forming unit is configured to for second paper with the defibrated material after being transported by the second transport unit. The control unit is configured to control volume of the first paper supplied to the dry type defibrator unit.

7 Claims, 3 Drawing Sheets

(51) Int. Cl.
 *D21B 1/08* (2006.01)
 *D21F 9/02* (2006.01)
 *D21C 5/02* (2006.01)
 *D21G 9/00* (2006.01)

(56) References Cited

U.S. PATENT DOCUMENTS 7,290,353 B2 11/2007 Yancey et al.
7,334,347 B2 2/2008 Mann et al.
8,882,965 B2 * 11/2014 Yamagami ............... D21B 1/08
 162/261
9,194,081 B2 * 11/2015 Yamagami ............... D21B 1/08

FOREIGN PATENT DOCUMENTS

| | | |
|---|---|---|
| JP | 01-148888 A | 12/1989 |
| JP | 06-093585 A | 4/1994 |
| JP | 06-155418 A | 6/1994 |
| JP | 07-026451 A | 1/1995 |
| JP | 07-102493 A | 4/1995 |
| JP | 07-124498 A | 5/1995 |
| JP | 2001-140184 A | 5/2001 |
| JP | 2003-500560 A | 1/2003 |
| JP | 2008-508443 A | 3/2008 |
| WO | 2006/012898 A1 | 2/2006 |

\* cited by examiner

PAPER RECYCLING DEVICE AND PAPER RECYCLING METHOD

CROSS-REFERENCE TO RELATED APPLICATIONS

This is a divisional application of U.S. patent application Ser. No. 14/484,385 filed on Sep. 12, 2014, now U.S. Pat. No. 9,194,081, which is a divisional application of U.S. patent application Ser. No. 13/979,089 filed on Oct. 3, 2013, now U.S. Pat. No. 8,882,965, which is a U.S. national phase application that claims priority to Japanese Patent Application Nos. 2011/004113, 2011/005573, and 2011/005574 filed on Jan. 12, 2011, Jan. 14, 2011, and Jan. 14, 2011 respectively. The entire disclosures of U.S. patent application Ser. Nos. 14/484,385 and 13/979,089 and Japanese Patent Application Nos. 2011/004113, 2011/005573, and 2011/005574 are hereby incorporated herein by reference.

BACKGROUND

1. Technical Field

The present invention relates to a paper recycling device and paper recycling method based on paper recycling technology using a dry method that to the extent possible does not use water.

2. Related Art

In the past, with recycling of old paper discharged from offices or the like, a so-called wet method was used by which old paper was put into water, defibrated using mainly mechanical action, and remade. This kind of wet method old paper recycling requires a large volume of water, so the processing scale has to be large to make it inexpensive. Because of that, collecting a large volume of old paper is essential, and in addition to a great deal of effort being required for preparation and maintenance of the water processing equipment, there was also the problem that a large volume of energy is used for the drying process.

However, since old paper on which confidential items are noted is also discharged from offices, from the perspective of maintaining confidentiality as well, there is a desire to process old paper within one's own office. However, since the volume of old paper discharged from a small office is small, it is difficult to ensure the volume necessary for a large scale process like that described above. Also, it is not realistic to install equipment for large scale processing like that noted above within an office. In light of that, to do paper recycling, up to now, several dry method paper recycling technologies that to the extent possible do not use water have been proposed.

For example, disclosed with the invention noted in Patent Document 1 (Patent Application Publication No. H01-148888) is use of secondary fiber sources as sheets for printing newspaper by defibrating them using a dry method, and by making the printed ink into tiny ink spots that are difficult to detect.

SUMMARY

However, the paper that is recycled using the technology noted in Patent Document 1 has not gone through the so-called deinking process that removes components of ink grains and the like contained in the fiber obtained by defibrating old paper, so there was the problem that the whiteness level was low, and its applicability was limited to paper for printing newspapers or the like.

A paper recycling device according to one aspect includes a dry type defibrator, a first transport unit, a classifier unit, a second transport unit a paper forming unit and a control unit. The dry type defibrator unit is configured to defibrate first paper into defibrated material. The first transport unit is configured to transport the defibrated material after being defibrated by the dry type defibrator unit. The classifier unit is configured to deink by an air flow classification the defibrated material after being transported by the first transport unit. The second transport unit is configured to transport the defibrated material after being deinked by the classifier unit. The paper forming unit is configured to form second paper with the defibrated material after being transported by the second transport unit. The control unit is configured to control volume of the first paper supplied to the dry type defibrator unit.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
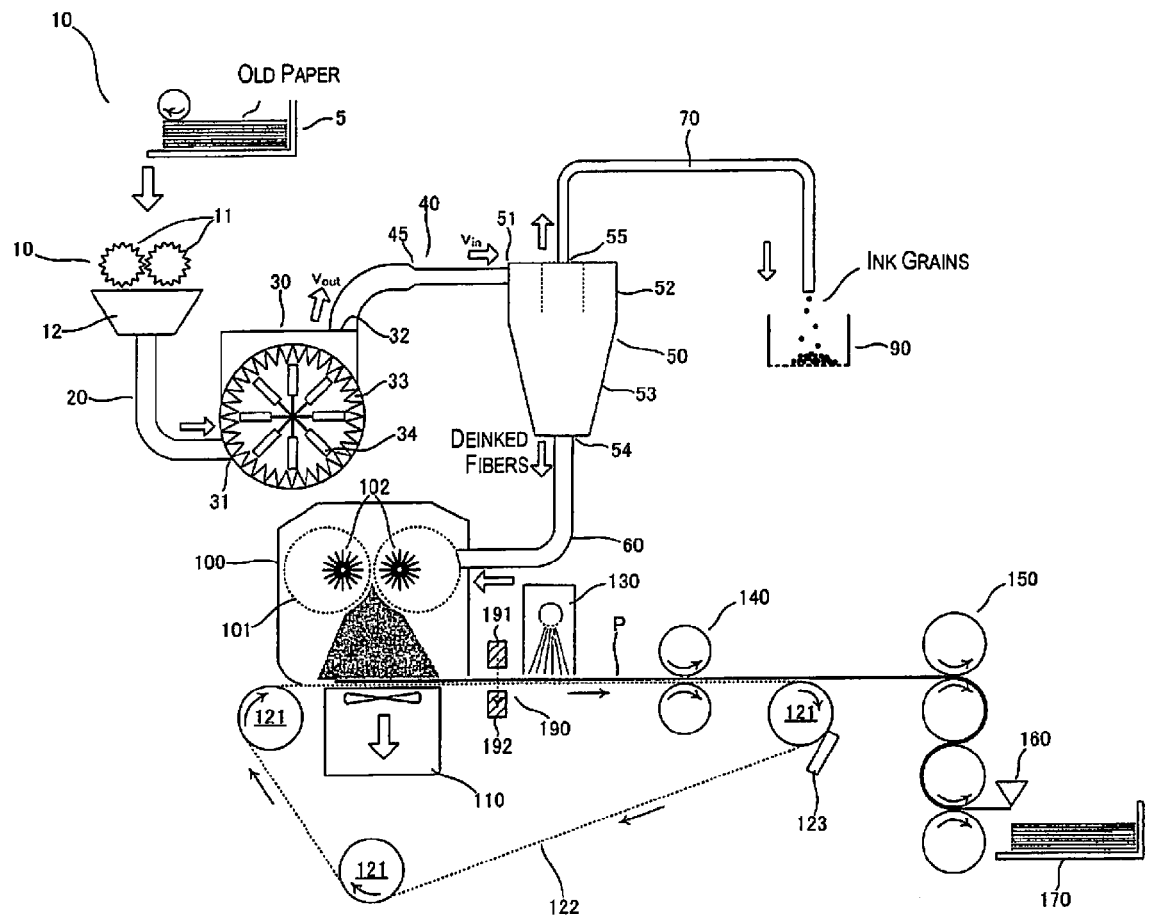
FIG. 1 is a pattern diagram showing the schematic structure of the paper recycling device of an embodiment of the invention.

Following, we will describe an embodiment of the invention while referring to the drawings. FIG. 1 is a pattern diagram showing the schematic structure of the paper recycling device of an embodiment of the invention. The paper recycling device of this embodiment is based on technology for recycling old paper into new paper using a dry method that to the extent possible does not use water.

As the old paper supplied to the paper recycling device of this embodiment, for example, old paper of A4 size which is currently the mainstream in offices or the like is used. This kind of old paper is input to a coarse crusher 10 of the paper recycling device, and the old paper is cut into paper pieces of several centimeters square by a coarse crushing blade 11 of the coarse crusher 10. Also, it is preferable to provide an automatic feed mechanism 5 for continuously inputting old paper in this kind of coarse crusher 10. Considering productivity, it is preferable that the input speed of the automatic feed mechanism 5 be high, but if it is too high, the device for processing becomes very large, so it is desirable to be 10 to 100 ppm.

The coarse crushing blade 11 of the coarse crusher 10 can be handled by using a device such as one for which the cutting width of the blade of a normal shredder has been widened. Coarsely crushed paper pieces cut into several centimeters square by the coarse crushing blade 11 are led via a coarsely crushed paper introduction pipe 20 from a hopper 12 to the defibrating process which is the next process.

The coarsely crushed paper introduction pipe 20 is in communication with an introduction port 31 of a dry type defibrator 30, and the coarsely crushed paper led into the dry type defibrator 30 from the introduction port 31 is defibrated between a rotating rotor 34 and a stator 33. The dry type defibrator 30 is a mechanism that generates air flow, and the defibrated fibers ride this air flow and are led from an exhaust port 32 to a first transport pipe 40.

Here, we will describe a specific example of the dry type defibrator 30. For the dry type defibrator 30, for example, it is possible to use a dry type old paper defibrator device equipped with a disc refiner, a turbo mill (made by Turbo Kogyo Co., Ltd.), a ceren miller (made by Masuko Sangyo Co., Ltd.), or a wind generating mechanism such as that disclosed in Patent Application Publication No. H06-93585. The size of the paper pieces input to this kind of dry type defibrator 30 can be items discharged by a normal shredder, but when considering paper strength, it is better to be larger than the fine paper pieces for confidential processing discharged by a shredder (e.g. 4 mm to 5 mm wide), but when too large, it becomes difficult to input into the dry type defibrator 30, so items cut into several centimeters square are desirable.

Also, with the dry type defibrator 30 equipped with a wind generating mechanism, using the air flow generated by itself, paper pieces are suctioned together with the air flow from the introduction port 31, undergo defibrating processing, and are transported to the exhaust port 32 side.

For example, with the Impeller Mill 250 (made by Seishin Enterprise Co., Ltd.) which is a turbo mill format, by installing 12 blades at the output side, when at 8000 rpm (peripheral speed approximately 100 m/s), it is possible to generate wind volume of approximately 3 m³/min. The wind speed at the introduction port 31 side at this time is approximately 4 m/s, and the paper pieces are introduced by riding this air flow. The introduced paper pieces are defibrated between the blades rotating at high speed and the stator, and are exhausted from the exhaust port 32. The exhaust speed is approximately 6.5 m/s at exhaust pipe diameter φ100.

When using the dry type defibrator 30 not equipped with a wind generating mechanism, it is acceptable to separately provide air flow leading the coarse paper pieces into the introduction port 31.

With the defibrating process at the dry type defibrator 30, defibrating pulp to a fiber form for which the shape of the paper pieces disappears is preferable because unevenness of the paper formed at the subsequent step is eliminated. At this time, coating materials and the like for paper such as printed ink or toner, bleed prevention agent or the like are also crushed, and are crushed until they become grains of several tens of μm (hereafter called ink grains). Therefore, the output from the dry type defibrator 30 is the fiber and ink grains obtained by defibrating the paper pieces.

Also, as the dry type defibrator 30, for example, when using a disk refiner, blades are formed in the radial direction on a round disk surface, but it is desirable to use blades with an edge on the circumference. Also, for the gap of the rotating blades of the rotor 34 side and the fixed blades of the stator 33, it is desirable to maintain approximately the paper piece thickness, for example approximately 100 to 150 μm. At this time, the defibrated material is moved to the outer circumference by the air flow generated by the rotating blades, and exhausted from the exhaust port 32.

The defibrated material which rode the air flow from the exhaust port 32 of the dry type defibrator 30 is introduced to a cyclone 50 from the first transport pipe 40. Here, midway in the first transport pipe 40 is provided a tube diameter reduction part 45. This tube diameter reduction part 45 functions as an adjustment unit for performing adjustment of the air flow which transports fibers at the first transport pipe 40. Specifically, with this kind of adjustment unit, by performing adjustment of the transport cross section of the first transport pipe 40, adjustment is performed of the air flow that transports fibers in the first transport pipe 40. As a result, the air velocity at the introduction port 51 of the cyclone 50 is adjusted to be greater than the air velocity at the exhaust port 32 of the dry type defibrator 30.

The deinking process is implemented in the cyclone 50, and the fibers transported by the first transport pipe 40 are classified by air flow into ink grains and deinked fibers. With the invention, it is possible to use an air flow type classifier of another type instead of the cyclone 50, but among these, the cyclone is desirable because of its simple structure. As an air flow type classifier other than the cyclone, for example an elbow jet, an eddy classifier or the like can be used. The air flow type classifier generates a gyrating air flow, and separates and classifies mixed materials by size using centrifugal force, and it is possible to adjust the classification points by adjusting the air flow speed and the centrifugal force.

In terms of performing deinking using the cyclone 50, the tangent line input method cyclone is desirable because it has a relatively simple structure. This cyclone 50 is constituted from the introduction port 51, a cylinder part 52 for which the introduction port 51 is attached in the tangent line direction, an inverted cone part 53 following the cylinder part 52, a lower outlet port 43 provided at the top of the inverted cone part 53, and an upper exhaust port 55 for doing fine powder exhaust provided at the top center of the cylinder part 52. The defibrated material riding on the air flow (mixed material of fibers and ink grains) is preferably introduced from the introduction port 51 at approximately 10 to 20 m/s.

With the deinking process, the air flow on which the defibrated material is riding introduced from the introduction port 51 of the cyclone 50 changes with circumference motion at the cylinder part 52 of outer diameter ø approximately 100 to 300 mm, centrifugal force is applied, and by the synergistic effect with air flow, fibers become entangled and become large, the ink grains are separated, move to the inverted cone part 53, and the separated ink grains are led out as fine powder together with air to the upper exhaust port 55, and thus deinking advances.

However, it is advantageous for the introduction speed of the air flow on which defibrated material is riding to the cyclone 50 to be fast. Also, if the speed of the cyclone introduction unit is lower than the exhaust air speed of the dry type defibrator 30, then defibrated material is retained inside the first transport pipe 40, the density per unit length of the introduction unit to the cyclone 50 becomes high and the deinking performance decreases.

In light of that, with the paper recycling device of the invention, the tube diameter reduction part 45 is provided midway in the first transport pipe 40, and the air velocity at the introduction port 51 of the cyclone 50 is adjusted so as to be greater than the air velocity at the exhaust port 32 of the dry type defibrator 30.

Following, we will give a description using a specific example. The fine powder recovery volume recovered by the cyclone 50 was 2.9 weight % (with the total volume of old paper supplied to the paper recycling device as 100 weight %) when the defibrated material exhausted from the dry type defibrator 30 (ø100, cross section area approximately 78 cm²) was air classified by being introduced from the introduction port 51 of the cyclone 50 from the first transport pipe 40 having (1) a 100 mm×50 mm constant square cross section (cross section area approximately 50 cm²), and the whiteness level of the paper recycled at the forming step later was 82 (Xlite-L value). Also, at this time, the air velocity at the introduction port 51 of the cyclone 50 was 10 m/s.

The fine powder recovery volume recovered by the cyclone 50 was 3.8 weight % (with the total volume of old paper supplied to the paper recycling device as 100 weight %) when the defibrated material exhausted from the dry type defibrator 30 was air classified by being introduced from the introduction port 51 of the cyclone 50 from the first transport pipe 40 having (2) a tube diameter reduction part 45 with a square cross section of from 100 mm×50 mm to a square cross section of 100 mm×40 mm (cross section area approximately 40 cm²), and the whiteness level of the paper recycled at the forming step later was 88 (Xlite-L value). Also, at this time, the air velocity at the introduction port 51 of the cyclone 50 was 12 m/s.

The fine powder recovery volume recovered by the cyclone 50 was 4.9 weight % (with the total volume of old paper supplied to the paper recycling device as 100 weight %) when the defibrated material exhausted from the dry type defibrator 30 was air classified by being introduced from the introduction port 51 of the cyclone 50 from the first transport pipe 40 having (3) a tube diameter reduction part 45 with a square cross section of from 100 mm×50 mm to a square cross section of 100 mm×30 mm (cross section area approximately 30 cm²), and the whiteness level of the paper recycled at the forming step later was 91 (Xlite-L value). Also, at this time, the air velocity at the introduction port 51 of the cyclone 50 was 16.7 m/s.

The whiteness degree when recycled paper was formed without classifying the defibrated material exhausted from the dry type defibrator 30 using the cyclone 50 was 79 (Xlite-L value).

In any of cases (1) through (3), a slight amount of flocculent short fiber was included in the fine powder recovered by the cyclone 50, but a large volume of ink grains were included, and deinking was confirmed.

With the kind of deinking process described above, the material riding on the air flow and exhausted from the upper exhaust port 55 with the cyclone 50 passes through a third transport pipe 70 and is recovered in a receiving unit 90. In the material recovered by this receiving unit 90, short fiber mixed material in which a large volume of ink grains is contained as described previously is recovered.

Also, with the deinking process noted above, the material exhausted from the lower outlet port 54 of the cyclone 50 is deinked fiber, and this deinked fiber is introduced to a paper forming machine 100 from the second transport pipe 60. For the paper forming machine 100, it is possible to use an item such as is described in Translation of Patent Publication No. 2008-508443.

We will describe a summary of the paper forming machine 100. The paper forming machine 100, in summary, has a mechanism for uniformly dispersing deinked fibers in air, and a mechanism for suctioning the deinked fibers dispersed by this onto the mesh belt 122.

A small hole screen is provided on the surface of a forming drum 101 of the paper forming machine 100, and deinked fibers are made to be discharged from this. Also, a needle roll 102 capable of rotating is provided inside the forming drum 101, and the deinked fibers are made to rise so as not to cause clogging of the small hole screen of the surface of the forming drum 101. Two forming drums 101 are made to be in communication at locations that are not illustrated. With the constitution like that described above, deinked fibers are dispersed uniformly in air.

Beneath the paper forming machine 100, an endless mesh belt 122 is placed with the mesh formed stretched by a tension roller 121. By rotating at least one of the tension rollers 121, this mesh belt 122 is made to move in the direction shown by the arrow in the drawing. Also, the mesh belt 122 has dirt and the like on its surface removed by a cleaning blade 123 that abuts it.

Also, vertically downward from the two forming drums 101 is provided a suction device 110 for generating air flow facing vertically downward in a form via the mesh belt 122. The deinked fibers dispersed in air are suctioned onto the mesh belt 122 by this kind of suction device 110.

With the kind of constitution described above, the deinked fibers transported by the second transport pipe 60 are introduced into the paper forming machine 100 to form paper. With the paper forming machine 100, the deinked fibers are entangled in the cyclone 50, so they are untangled again by the needle roll 102 or the like. The untangled deinked fibers pass through the small hole screen of the forming drum 101 surface, and are deposited on the mesh belt 122 by the suction force of the suction device 110. At this time, by moving the mesh belt 122, it is possible to deposit deinked defibrated material in an even sheet form. This deinked defibrated material becomes recycled paper (P).

Whether the mesh belt 122 is metal, resin, or non-woven fabric, the deinked fibers can be deposited, and any material is acceptable as long as air flow can pass through, but if the hole diameter of the mesh is too large, dents and bumps occur when the paper P is formed, so it is preferable that the hole diameter be approximately 60 to 125μ. Also, when 60μ or less, it is difficult to form a stable air flow with the suction device 110. For the suction device 110, it is possible to form a sealed box with windows of the desired size opened below the mesh belt 122, and to form it by making the inside of the box a vacuum by suctioning the air from outside the window.

If a sheet for which deinked fibers are deposited on the mesh belt 122 is pressed as is, the paper strength is insufficient, so the hydrogen bonding between fibers is enhanced by adding water by spraying using the water sprayer 130.

After that, the recycled paper (P) sprayed with water by the water sprayer 130 passes through a heater roller 140 along with movement of the mesh belt 122, but by being heated and pressed by this heater roller 140, the fiber gap is made shorter and the contact points between fibers becomes stronger. By doing this, the strength of the recycled paper (P) as paper is increased, and by drying the excess water, it is possible to make excellent paper. Drying is done by installing a heater inside the press roller, and it is preferable to do pressing and drying simultaneously. By adding a so-called paper strength enhancer such as starch, PVA or the like to the water sprayed by the water sprayer 130, it is possible to enhance the paper strength.

The recycled paper (P) obtained as described above can be processed using a calendar roller 150 to improve the surface smoothness. The recycled paper (P) processed using the calendar roller 150 is cut to the desired size using a cutter 160, and is loaded using a stacker 170 or the like.

Figure 2:
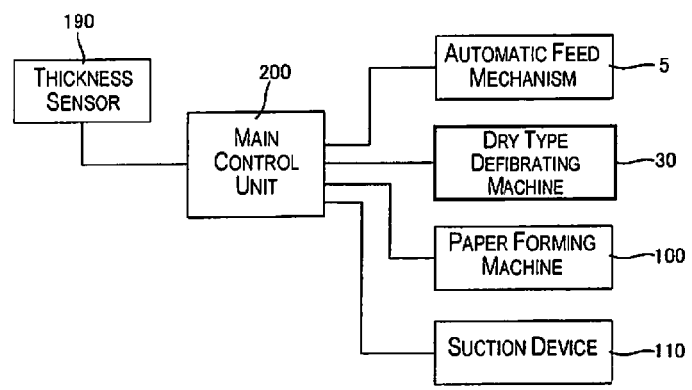
FIG. 2 is a drawing schematically showing the control block structure of the paper recycling device of the embodiment of the invention.

We will describe an example of control of the paper recycling device constituted as described above. FIG. 2 is a drawing schematically showing the constitution of the control block of the paper recycling device of an embodiment of the invention. In FIG. 2, the main control unit 200 is a main controller for performing various controls of the paper recycling device of the invention. Using a general purpose information processing device equipped with a CPU and RAM, ROM or the like, it is possible to realize this kind of main control unit 200 by storing in advance in a ROM program that has the CPU execute the operation of outputting commands to a designated block based on designated information that has been input.

The detection results by the thickness sensor 190 that detects the thickness of the deinked defibrated material deposited on the mesh belt 122 are input to the main control unit 200 like that noted above. With the main control unit 200, the detection results data output from the thickness sensor 190 are processed, and are used for controlling the paper recycling device.

Also, the main control unit 200 is made to output control instruction signals for controlling the feeding speed of old paper with the automatic feed mechanism 5, and when these are received at the automatic feed mechanism 5, the feeding speed of the old paper is adjusted based on these.

Also, the main control unit 200 is made to output control instruction signals for controlling the rotation speed of the rotor 34 of the dry type defibrator 30, and when these are received by the dry type defibrator 30, the rotation speed of the rotor 34 is adjusted based on these.

Also, the main control unit 200 is made to output control instruction signals for controlling the paper forming process speed with the paper forming machine 100, and when these are received at the paper forming machine 100, the process speed is adjusted based on these.

Also, the main control unit 200 is made to output control instruction signals for controlling the suction force of the suction device 110, and when these are received by the suction device 100, the suction force is adjusted based on these.

Next, we will describe an example of control of the paper recycling device constituted as described above. For the recycled paper obtained with the paper recycling device of the invention, the basis weight is determined by the volume of deinked fiber deposited on the mesh belt 122.

The basis weight of the old paper input to the device by the automatic feed mechanism 5, for example, is not fixed, ranging from thin paper of approximately 60 g to thick paper of approximately 120 g, so if the input old paper is input at a fixed number of sheets, the volume of processed fiber will vary, and the basis weight of the produced paper will also vary.

Also, for the deinking process, the deinking volume also varies by the volume of crushed ink, so the volume that goes to the fine powder side (upper exhaust port 55 side) of the cyclone 50 also varies, and as a result, the volume of obtained deinked defibrated material also varies, and this leads to variation in the paper basis weight.

In light of that, with this embodiment, the thickness of the deinked defibrated material deposited on the mesh belt 122 is measured, and feedback is given for the mesh belt 122 speed and the speed of the old paper input volume by the automatic feed mechanism 5.

In specific terms, the device is started, and immediately after the deinked fiber is deposited on the mesh belt 122, the thickness of the deposited material is measured by the thickness sensor 190, and when that measurement result does not reach a designated thickness, the mesh belt speed is slowed, and if it is still insufficient, the old paper input speed at the automatic feed mechanism 5 is increased, and when it is a designated thickness or greater, the mesh belt speed is speeded up, and when it is still too much with that, the old paper input speed at the automatic feed mechanism 5 is lowered. The designated thickness setting changes according to the defibrating strength of the dry type defibrator 30, the suction force of the suction device 110, and the desired thickness of the completed recycled paper, but as a general guideline, it is possible to make recycled paper of approximately 100 to 150µ when the deposited material thickness is approximately 4 to 5 mm.

In this way, with this embodiment, the thickness of the paper formed by the paper forming machine 100 (thickness of the deinked defibrated material) is detected by the thickness sensor 190, and the main control unit 200 controls the automatic feed mechanism 5 to adjust the speed of the mesh belt 122 and the volume of paper supplied to the dry type defibrator 30 based on the detection results of the thickness sensor 190. By doing this, it is possible to obtain recycled paper of stable quality.

The paper recycling device and paper recycling method of the invention like those described above have air classification of the old paper fibers into ink grains and deinked fibers done using a classifier unit such as the cyclone 50 or the like, and paper is formed with the deinked fibers, so with the paper recycling device and the paper recycling method of the invention, it is possible to recycle paper with an improved level of whiteness that can be used widely for purposes other than paper for newspapers. Also, with the paper recycling device and the paper recycling method of the invention, it is possible to have minimal water for the water use, so even when the device is made more compact, compared to the wet type method, regardless of the drying time, high productivity of 10 ppm or greater is expected.

Figure 3:
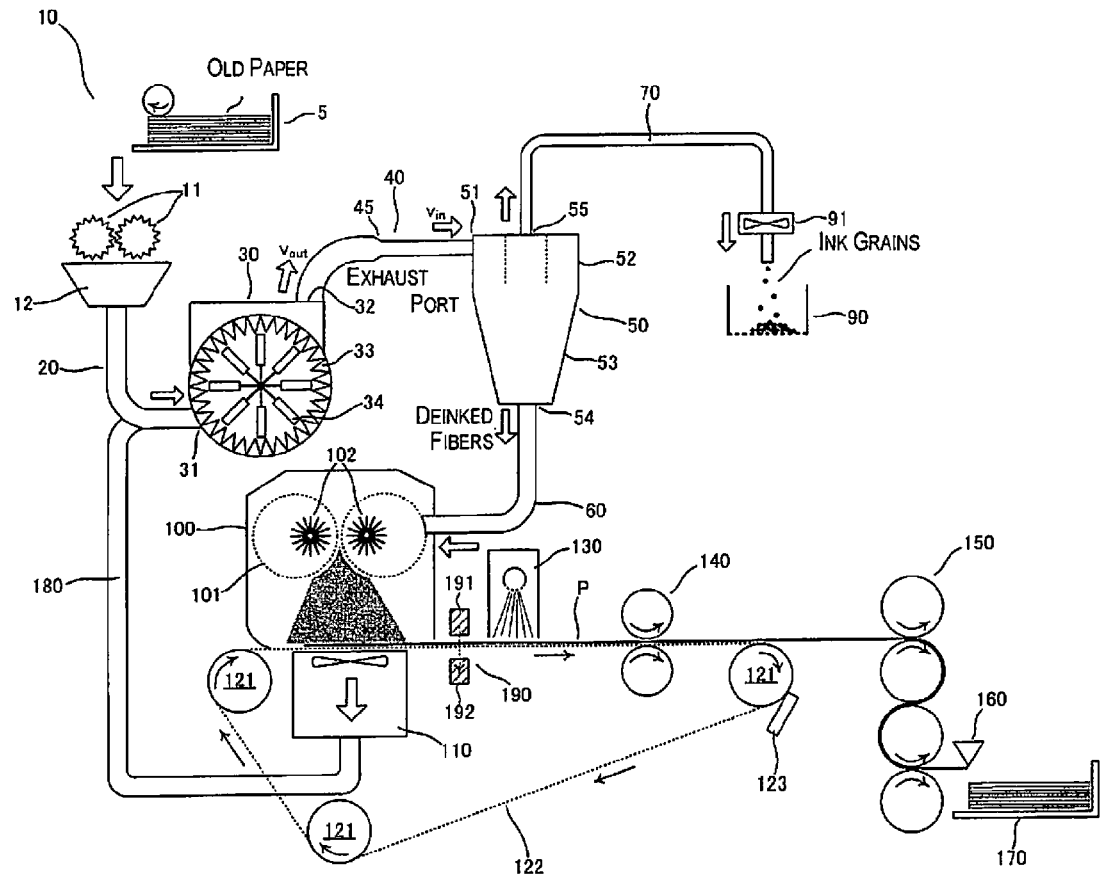
FIG. 3 is a pattern diagram showing the schematic structure of the paper recycling device of another embodiment of the invention.

Next, we will describe another embodiment of the invention. FIG. 3 is a pattern diagram showing the schematic structure of the paper recycling device of another embodiment of the invention. In FIG. 3, constitutions given the same reference numbers as those of the previous embodiment are the same as the previous items, so we will omit a description thereof.

The first point of this embodiment that differs from the previous embodiment is that with this embodiment, the air flow suctioned by the suction device 110 is led to the introduction port 31 of the dry type defibrator 30 using a fourth transport pipe 180. By doing this, the coarsely crushed paper pieces from the coarse crusher 10 obtain air flow energization and enter into the dry type defibrator 30. With this kind of constitution, the air velocity at the exhaust port 32 of the dry type defibrator 30 can be further increased compared to the air velocity of the previous embodiment. Then, as a result, the air velocity at the introduction port 51 of the cyclone 50 can also be further increased compared to the air velocity of the previous embodiment, and an increase in the deinking efficiency of the cyclone 50 can be expected.

Also, the second point of this embodiment that differs from the previous embodiment is that with this embodiment, a suction unit 91 such as a blower or the like is provided in the third transport pipe 70, and the air flow exhausted from the upper exhaust port 55 of the cyclone 50 is further increased, and furthermore, the air velocity at the introduction port 51 of the cyclone 50 is further increased. As a result, it is possible to expect increased efficiency of deinking with the cyclone 50 beyond that of the previous embodiment. The suction method of the blower at this time can be made to be at a level for which there will not be backflow at the cyclone outlet port, or can be made to drive continuously by repeatedly doing deinking with the cyclone outlet port temporarily blocked, and then opening the outlet port after stopping the blower.

Figure 4:
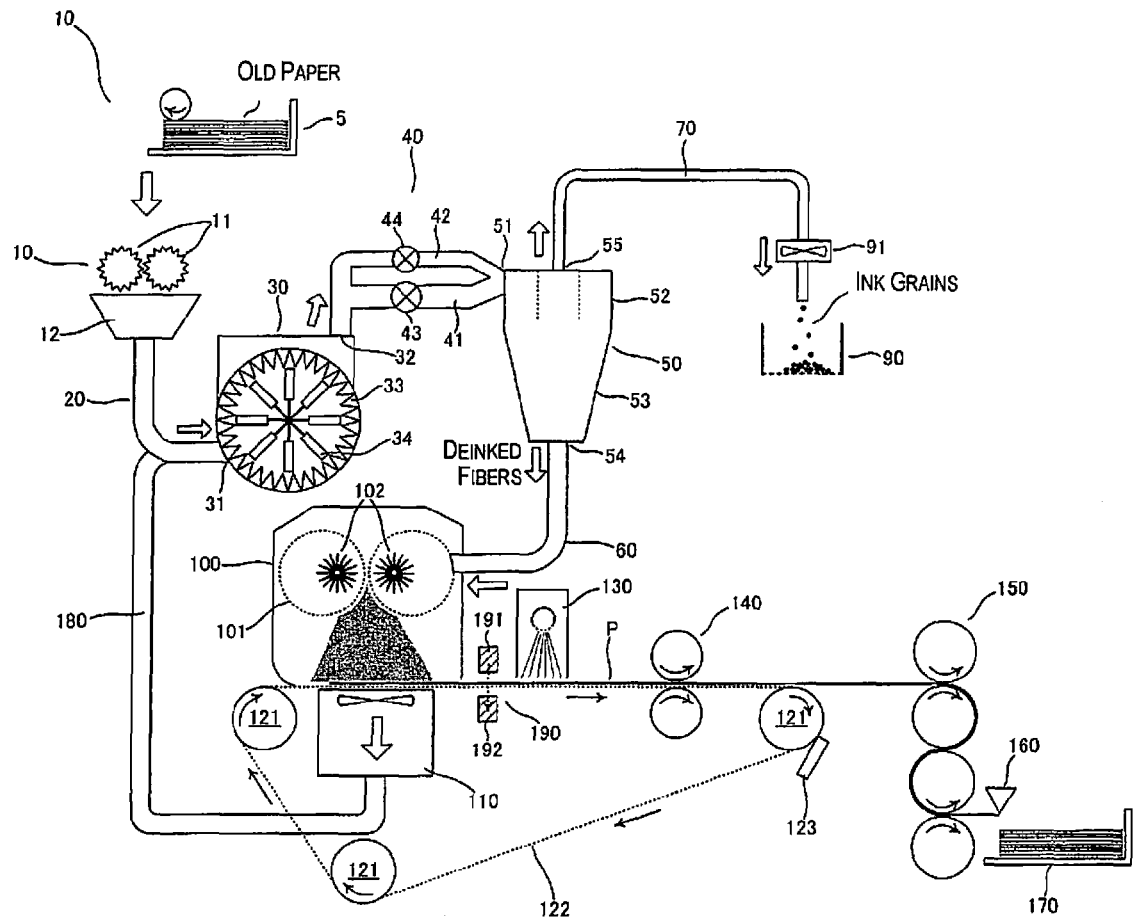
FIG. 4 is a pattern diagram showing the schematic structure of the paper recycling device of another embodiment of the invention.

Next, we will describe another embodiment of the invention. FIG. 4 is a pattern diagram showing the schematic structure of the paper recycling device of another embodiment of the invention. In FIG. 4, constitutions given the same reference numbers as the first embodiment shown in FIG. 1 are the same as the first items, so a description thereof is omitted.

The first point of this embodiment that differs from the first embodiment is that with this embodiment, the air flow suctioned by the suction device 110 is led to the introduction port 31 of the dry type defibrator 30 using the fourth transport pipe 180. By doing this, the coarsely crushed paper pieces from the coarse crusher 10 obtain air flow energization and enter into the dry type defibrator 30. With this kind of constitution, the air velocity at the exhaust port 32 of the dry type defibrator 30 can be further increased compared to the air velocity of the first embodiment. Then, as a result, the air velocity at the introduction port 51 of the cyclone 50 can also further be made higher than the air velocity of the first embodiment, and increased efficiency can be expected with the cyclone 50.

The second point of this embodiment that differs from the first embodiment is that with this embodiment, the suction unit 91 such as a blower or the like is provided in the third transport pipe 70, and the air flow exhausted from the upper exhaust port 55 of the cyclone 50 is made to be increased further, and the air velocity at the introduction port 51 of the cyclone 50 is made to be further increased. As a result, increased efficiency of deinking with the cyclone 50 can be expected beyond that of the first embodiment. The suction method of the blower at this time can be made to be at a level for which there will not be backflow at the cyclone outlet port, or can be made to drive continuously by repeatedly doing deinking with the cyclone outlet port temporarily blocked, and then opening the outlet port after stopping the blower.

Also, the third point of this embodiment that differs from the first embodiment is that with this embodiment, the first transport pipe 40 is constituted from a first diameter piping 41 and a second diameter piping 42 having a smaller pipe diameter than the first diameter piping 41. A first valve 43 is provided in the pipe path in the first diameter piping 41, and a second valve 44 is provided in the pipe path in the second diameter piping 42.

With this embodiment, it is possible to select between leading the defibrated fibers using the first diameter piping 41 to the introduction port 51 of the cyclone 50 by opening the first valve 43 and closing the second valve 44, or to lead the defibrated fibers using the second diameter piping 42 to the introduction port 51 of the cyclone 50 by closing the first valve 43 and opening the second valve 44. With the latter, in the case of leading to the introduction port 51 that leads fibers, it is possible to accelerate the air velocity at the introduction port 51 compared to the former case. Specifically, in the case of a raw material with a large amount of relatively white paper or uncoated paper, or in the case when the deinking efficiency is relatively low, it is possible to operate using the piping 41 for which the speed is low at the cyclone introduction port, and conversely, when the ink adherence volume is large, or in the case of a raw material with a large amount of coated paper, to make the deinking efficiency high, it is possible to operate using the high speed piping 42. With this embodiment, the first valve 43 in the first diameter piping 41 and the second valve 44 in the second diameter piping 42 function as the previously noted adjustment unit. With this kind of embodiment, it is possible select the deinking efficiency that is required as appropriate.

Above, the paper recycling device and the paper recycling method of the invention do air classification of the old paper fibers into ink grains and deinked fibers using the classifier unit, and paper is formed with the deinked fibers, so with the paper recycling device and the paper recycling method of the invention, it is possible to recycle paper that has a higher level of whiteness that can be used widely for applications other than paper for newspapers.

Also, with the paper recycling device and the paper recycling method of the invention, it is possible to make the device more compact, and possible to install it in an office, so it is possible to perform paper recycling simultaneously with confidential document processing in small volumes that occur with relatively small offices.

Also, with the paper recycling device and the paper recycling method of the invention, the constitution is such that to the extent possible it does not use water, so the device constitution is such that it is possible to reduce the water processing equipment and make the device constitution simple, and furthermore, a large scale heater or the like for drying water is not needed, so the energy efficiency with old paper recycling is high.

Also, with the paper recycling device and the paper recycling method of the invention, it is possible to recycle paper in a relatively short time, so productivity is high.

To address problems such as those noted above, the embodiment of the present invention is characterized in that the paper recycling device of the embodiment has a dry type defibrator unit for crushing paper and defibrating it, a first transport unit for conveying defibrated material defibrated by the dry type defibrator unit, a classifier unit that does deinking by doing air flow classification of the defibrated material transported by the first transport unit, a second transport unit that transports the defibrated material deinked by the classifier unit, and a paper forming unit that forms paper with the defibrated material transported by the second transport unit.

Also, with the paper recycling device of the embodiment, the flow velocity of the air flow of the classifier unit's connecting part with the first transport unit is higher than the flow velocity of the air flow of the dry type defibrator unit's connecting part with the first transport unit.

Also, with the paper recycling device of the embodiment, the classifier unit is a cyclone.

Also, with the paper recycling device of the embodiment, the paper forming unit has a dispersion member for dispersing in the air the defibrated material transported by the second transport unit, a suction member for suctioning the dispersed defibrated material, and a mesh belt for transporting the defibrated material suctioned by the suction member.

Also, with the paper recycling device of the embodiment, the mesh belt transports the formed paper and also has a water sprayer for spraying water on the formed paper.

Also, the paper recycling device of the embodiment has a heater roller for heating the paper sprayed by water using the water sprayer.

Also, the paper recycling device of the embodiment has a third transport unit for transporting classified material classified from the defibrated material by the classifier unit, and a suction unit that suctions the classified material transported by the third transport unit.

Also, the paper recycling method of the embodiment is characterized by defibrating paper by dry type crushing, transporting the defibrated material using the first transport unit, doing air flow classification and deinking of the defibrated material transported by the first transport unit, transporting by the second transport unit the defibrated material deinked by the classifying process, and forming paper using the defibrated material transported by the second transport unit.

Also, the paper recycling device of the embodiment is characterized by having a dry type defibrator unit for doing dry type crushing and defibrating of paper, a first transport unit for transporting using air flow the defibrated material defibrated by the dry type defibrator unit, an adjustment unit for adjusting the air flow of the first transport unit, a classifier unit for doing air flow classification and deinking of the defibrated material transported by the first transport unit, a second transport unit for transporting the defibrated material deinked by the classifier unit, and a paper forming unit for forming paper from the defibrated material transported by the second transport unit.

Also, with the paper recycling device of the embodiment, the first transport unit has a transport pipe for moving defibrated material, and the adjustment unit adjusts the cross section surface area of the transport pipe.

Also, with the paper recycling device of the embodiment, the flow velocity of the air flow of the classifier unit's connecting part with the first transport unit is greater than the flow velocity of the air flow of the dry type defibrator unit's connecting part with the first transport unit.

Also, with the paper recycling device of the embodiment, the classifier unit is a cyclone.

Also, with the paper recycling device of the embodiment, the paper forming unit has a dispersion member for dispersing defibrated material, a suction member for suctioning the dispersed defibrated material, and a mesh belt for transporting the defibrated material suctioned by the suction member.

Also, with the paper recycling device of the embodiment, the mesh belt transports the formed paper, and also has a water sprayer for spraying water on the paper transported by the mesh belt.

Also, the paper recycling device of the embodiment has a heater roller for heating the paper sprayed with water by the water sprayer.

Also, the paper recycling method is characterized by doing dry type crushing and defibrating of paper, transporting the defibrated material using air flow for which the flow velocity was adjusted, doing air flow classification and deinking of the transported defibrated material, transporting the deinked defibrated material, and forming paper using the transported defibrated material.

Also, the paper recycling device of the embodiment is characterized by having a dry type defibrator unit that does dry type crushing and defibrating of the supplied paper, a first transport unit that transports the defibrated material that was defibrated by the dry type defibrator unit, a classifier unit that does air flow classification and deinking of the defibrated material transported by the first transport unit, a second transport unit that transports the defibrated material that was deinked by the classifier unit, a paper forming unit that forms paper with the defibrated material transported by the second transport unit, and a control unit that controls the volume of paper supplied to the dry type defibrator unit.

Also, the paper recycling device of the embodiment has a detector unit that detects the thickness of the paper formed by the paper forming unit, and the control unit controls the volume of paper supplied to the dry type defibrator unit based on the detection results of the detector unit.

Also, with the paper recycling device of the embodiment, the flow velocity of the air flow of the classifier unit's connecting part with the first transport unit is greater than the flow velocity of the air flow of the dry type defibrator unit's connecting part with the first transport unit.

Also, with the paper recycling device of the embodiment, the classifier unit is a cyclone.

Also, with the paper recycling device of the embodiment, the paper forming unit has a dispersion member that disperses defibrated material, a suction member that suctions the dispersed defibrated material, and a mesh belt that transports the defibrated material suctioned by the suction member.

Also, with the paper recycling device of the embodiment, the mesh belt transports the formed paper, and also has a water sprayer that sprays water on the paper transported by the mesh belt.

Also, the paper recycling device of the embodiment has a heater roller that heats the paper sprayed with water by the water sprayer.

Also, the paper recycling method of the embodiment is characterized by supplying a controlled volume of paper, doing dry type crushing and defibrating of the supplied paper, transporting the defibrated material, doing air flow classification and deinking of the transported defibrated material, transporting the deinked defibrated material, and forming paper with the transported defibrated material.

As described above, the paper recycling device and paper recycling method of the embodiment uses the classifier unit to do air flow classification of the old paper fibers into ink grains and deinked fibers, and forms paper with those deinked fibers, so with the paper recycling device and paper recycling method of the invention, it is possible to recycle paper for which the level of whiteness has been increased and which can be used for a wide variety of applications other than for paper for newspapers.

As we go forward, mechanisms that consider the earth's environment will be in increasing demand, and the paper recycling device and the paper recycling method of the invention is an item that matches this kind of need, and can be expected to greatly increase social usability. Until now, with recycling of old paper exhausted from offices or the like, mainly, wet type method old paper recycling methods were used, and with this, it was essential to collect a large volume of old paper, and in addition to a great deal of effort being required for water processing equipment preparation and maintenance, there was also the problem that a great deal of energy was used for the drying process. In contrast to this, with the paper recycling device and the paper recycling method of the invention, deinking is performed using a classifier unit, and almost no water needs to be used, so it is possible to perform paper recycling simultaneously with processing of confidential documents in small volumes that occur in relatively small offices, and it is also possible to recycle paper with an increased whiteness level, and to have very high industrial applicability.

What is claimed is:

1. A paper recycling device comprising:
    a dry type defibrator unit being configured to defibrate first paper into defibrated material;
    a first transport unit being configured to transport the defibrated material after being defibrated by the dry type defibrator unit,
    a classifier unit being configured to deink by an air flow classification the defibrated material after being transported by the first transport unit;
    a second transport unit being configured to transport the defibrated material after being deinked by the classifier unit;
    a paper forming unit being configured to form second paper with the defibrated material after being transported by the second transport unit; and a control unit being configured to control volume of the first paper supplied to the dry type defibrator unit.

2. The paper recycling device according to claim 1, further comprising
a detector unit being configured to detect thickness of the second paper after being formed by the paper forming unit, wherein
the control unit is configured to control controls the volume of the second paper supplied to the dry type defibrator unit based on detection results of the detector unit.

3. The paper recycling device according to claim 1, wherein
a flow velocity of air flow at a first connecting part of the classifier unit and the first transport unit is greater than a flow velocity of air flow at a second connecting part of the dry type defibrator unit and the first transport unit.

4. The paper recycling device according to claim 1, wherein
the classifier unit is a cyclone.

5. The paper recycling device according to claim 1, wherein
the paper forming unit includes a dispersion member being configured to disperse the defibrated material,
a suction member being configured to suction the dispersed defibrated material, and
a mesh belt being configured to transport the defibrated material suctioned by the suction member.

6. The paper recycling device according to claim 5, wherein
the mesh belt is configured to transport the second paper after being formed, and includes a water sprayer being configured to spray water on the second paper after being transported by the mesh belt.

7. The paper recycling device according to claim 5, further comprising
a heater roller being configured to heat the second paper after the water is sprayed on the second paper.

* * * * *